United States Patent
Morimoto et al.

(10) Patent No.: US 8,700,025 B2
(45) Date of Patent: Apr. 15, 2014

(54) USER APPARATUS, RADIO BASE STATION, AND METHOD

(75) Inventors: Akihito Morimoto, Yokohama (JP); Motohiro Tanno, Yokohama (JP); Yoshihisa Kishiyama, Yokosuka (JP); Mamoru Sawahashi, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 506 days.

(21) Appl. No.: 13/058,203

(22) PCT Filed: Jul. 27, 2009

(86) PCT No.: PCT/JP2009/063358
§ 371 (c)(1),
(2), (4) Date: Apr. 20, 2011

(87) PCT Pub. No.: WO2010/018746
PCT Pub. Date: Feb. 18, 2010

(65) Prior Publication Data
US 2011/0189988 A1 Aug. 4, 2011

(30) Foreign Application Priority Data
Aug. 11, 2008 (JP) ................................. 2008-207486

(51) Int. Cl.
*H04W 4/00* (2009.01)

(52) U.S. Cl.
USPC ........ 455/422.1; 455/436; 455/443; 455/448; 455/450; 455/509

(58) Field of Classification Search
USPC ............... 455/436, 422.1, 443, 448, 450, 509
See application file for complete search history.

(56) References Cited

U.S. PATENT DOCUMENTS

| | | | |
|---|---|---|---|
| 2004/0146021 A1* | 7/2004 | Fors et al. | 370/331 |
| 2009/0163208 A1* | 6/2009 | Rao | 455/436 |
| 2011/0021239 A1 | 1/2011 | Wakabayashi et al. | |

FOREIGN PATENT DOCUMENTS

| | | |
|---|---|---|
| JP | 2002-369237 A | 12/2002 |
| JP | 2007-006163 A | 1/2007 |
| JP | 2007-521745 A | 8/2007 |
| WO | 2005/006781 A2 | 1/2005 |
| WO | 2006/114873 A1 | 11/2006 |

OTHER PUBLICATIONS

International Search Report w/translation from PCT/JP2009/063358 dated Oct. 27, 2009 (3 pages).
Written Opinion from PCT/JP2009/063358 dated Oct. 27, 2009 (3 pages).

(Continued)

*Primary Examiner* — Kwasi Karikari
(74) *Attorney, Agent, or Firm* — Osha Liang LLP

(57) ABSTRACT

A mobile communications system includes a radio base station and a remote radio apparatus connected with a high-speed transmission medium to the radio base station. A user apparatus includes a unit which measures a received level of a signal transmitted from the radio base station and a received level of a signal transmitted from the remote radio apparatus and detects a change in relative magnitudes of measured values; a unit which measures a path loss between the user apparatus and the radio base station and a path loss between the user apparatus and the remote radio apparatus and detects a change in relative magnitudes of measured values; and a transmitter which transmits a report signal which shows that a predetermined event has occurred. The predetermined event occurs if the relative magnitudes of the received levels are reversed and/or if the relative magnitudes of the path losses are reversed.

22 Claims, 10 Drawing Sheets

(56) References Cited

OTHER PUBLICATIONS

3GPP2, C.S0084-001-0, Version 2.0; "Physical Layer for Ultra Mobile Broadband (UMB) Air Interface Specification"; Aug. 2007 (262 pages).

Office Action for Japanese Patent Application No. 2008-207486 mailed Oct. 23, 2012, with English translation thereof (4 pages).

3GPP TSG RAN WG1 Meeting #53bis, R1-082576, "Inter-cell Radio Resource Management for Heterogeneous Network"; NTT DoCoMo, Inc., Warsaw, Poland, Jun. 30-Jul. 4, 2008 (10 pages).

* cited by examiner

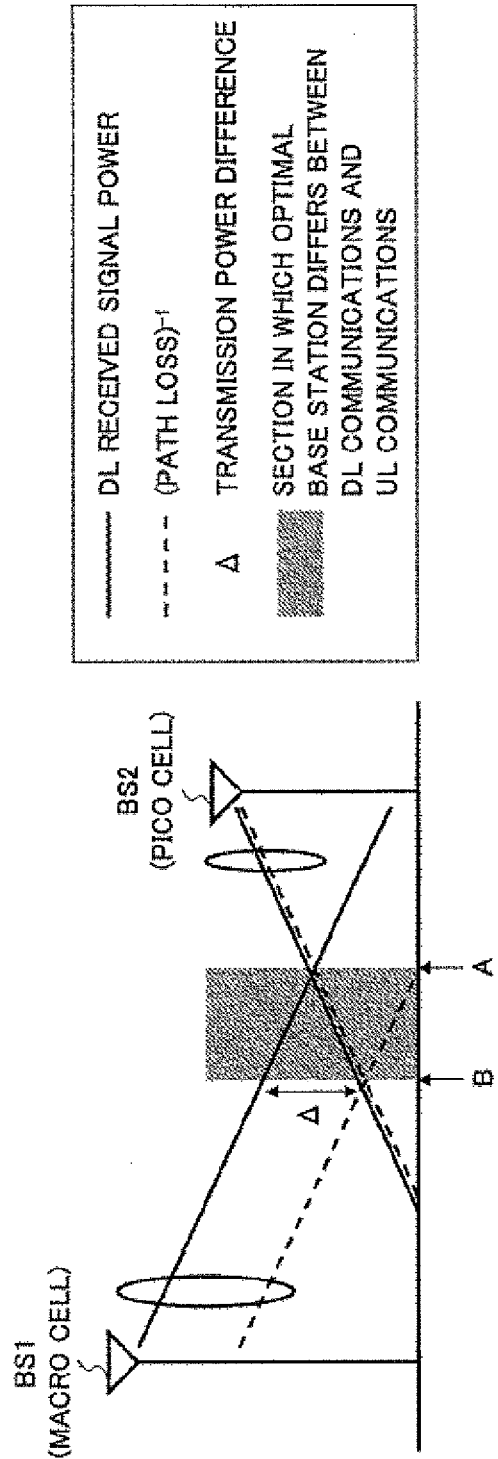

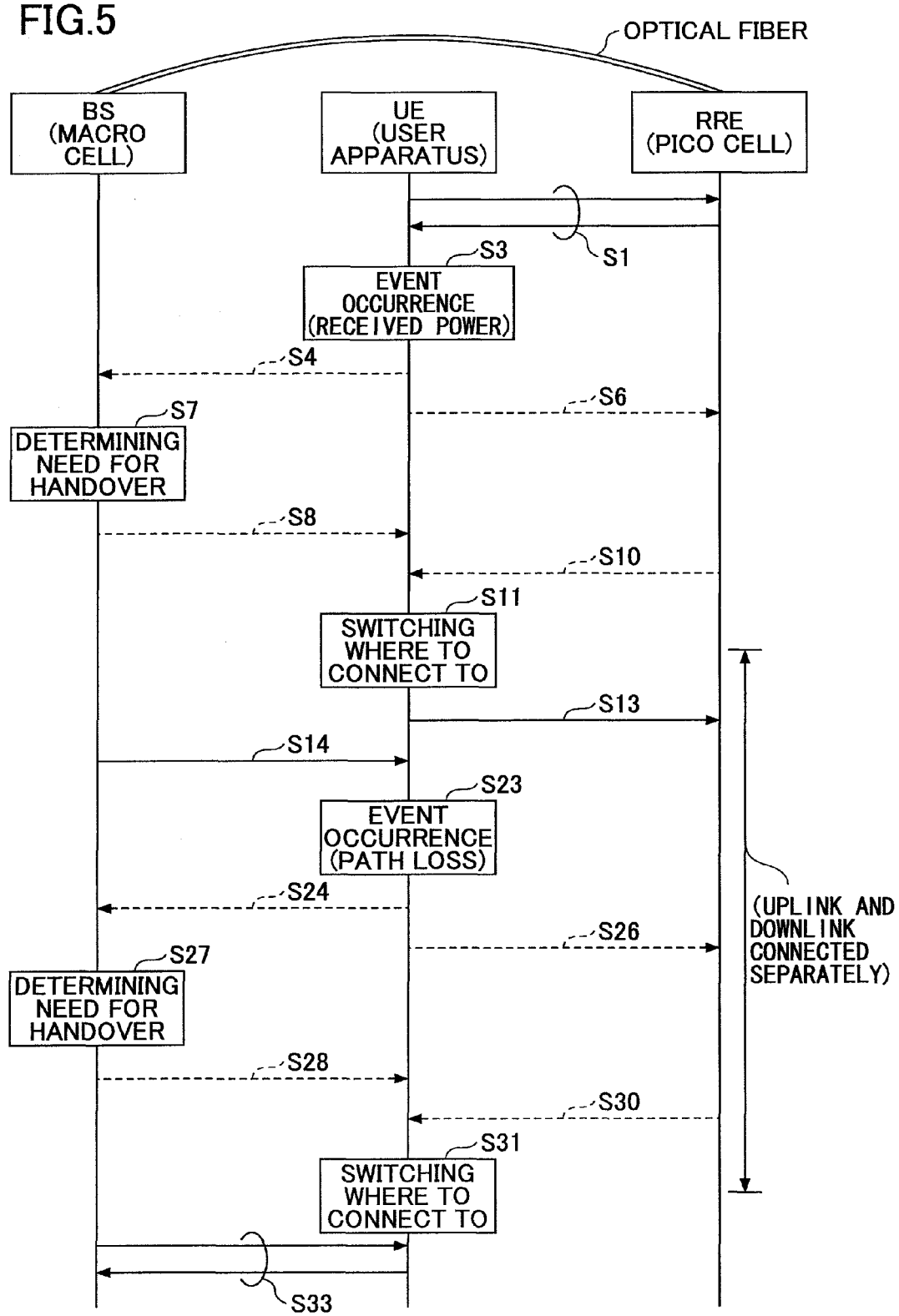

USER APPARATUS, RADIO BASE STATION, AND METHOD

BACKGROUND OF THE INVENTION

1. Field of the Invention

The present invention relates generally to the technical field of mobile communications, and specifically to user apparatuses, radio base stations, and methods.

2. Description of the Related Art

A service area of a mobile communications system includes regions (called cells) covered by abase station. The cells are classified into macro cells and micro cells. Typically, a region of the macro cell is large (a coverage is large), and transmission power of the base station is also large. On the other hand, a region of the micro cell is small (a coverage is small), and transmission power of a base station is also small. Of the micro cells, a cell with even a smaller coverage is called a pico cell. As an example, the pico cell is arranged at a location where traffic tends to concentrate, and complements the macro cell or the micro cell.

FIG. 1 shows how the macro cell and the pico cell neighbor. For convenience of explanations, a base station for the macro cell is referred to as BS1, while a base station for the pico cell is referred to as BS2. A downlink (DL) signal transmitted from the BS1, which attenuates with distance, reaches relatively far as it is transmitted with high power. As shown, a solid line extending from the BS1 schematically shows received power (power at the time of reception at a user apparatus) of a DL signal. A downlink (DL) signal transmitted from the base station BS2 for the pico cell, which also attenuates with distance, reaches relatively near only as it is transmitted with low power. As shown, a solid line extending from the BS2 schematically shows received power (power at the time of reception at a user apparatus) of a DL signal.

If transmission power of BS1 is the same as transmission power of BS2, the DL received signal power from the base station BS1 and the DL received signal power from the base station BS2 become theoretically equal at an intermediate point B. However, in the present example, the transmission powers of the respective base stations differ, so that the DL received signal powers of the respective base stations become equal at a point A shown (a point which is closer to BS2 than to the intermediate point B). This means that quality of a DL received signal from the base station BS1 is better in a section from the base station BS1 to the point A, in which section the base station BS1 is suitable for downlink communications. Moreover, in a section from the point A to the base station BS2, quality of a DL received signal from the base station BS2 becomes better, so that, in that section, the base station BS2 becomes a base station suitable for downlink communications. Typically, transmission power of the base station BS1 for the macro cell is greater than transmission power of the base station BS2 for the pico cell, so that a distance from the base station BS1 to the point A is greater than a distance from the base station BS2 to the point A.

On the other hand, a path loss or propagation loss is related to the difference between the transmission power and the received power, so that it depends, not on power at the time of transmitting, but on a distance between the base station and user apparatus. The greater the distance, the larger the path loss. In other words, the inverse of the path loss ((path loss)$^{-1}$) becomes small depending on the distance from a base station. Thus, as shown, the inverse of the path loss with respect to the base station BS1 and the inverse of the path loss with respect to the base station BS2 become equal at the intermediate point B. Whether quality of an uplink signal from a mobile station to a base station is good is related to the magnitude of the path loss (or the inverse thereof). Therefore, from the base station BS1 to the point B, quality of an uplink signal to the base station BS1 becomes better, so that in that section the base station BS1 is suitable for uplink communications. Moreover, from the base station BS2 to the point B, quality of the uplink signal to the base station BS2 becomes better, so that in that section the base station BS2 is suitable for uplink communications.

In this way, when transmission powers of neighboring base stations differ, a section (shaded portion in FIG. 1) occurs such that an optimal base station differs between downlink communications and uplink communications. If a user is within the section of the shaded portion, the following three methods of connection are possible:

(1) Connection is Made to the BS1 for Both Uplink and Downlink.

FIG. 2A shows how to connect to the BS1 for both uplink and downlink. In this case, downlink communications may be conducted well. On the other hand, for uplink communications, the user apparatus needs to transmit a signal with high power in order to ensure that a signal arrives at the base station BS1 via a relatively long distance. However, there is a concern that this may cause high interference power to the base station BS2, which is close in distance; and (2) Connection is Made to the BS2 for Both Uplink and Downlink.

Contrary to FIG. 2A, FIG. 2B shows how connection is made to the BS2 for both uplink and downlink. In this case, uplink communications may be conducted well. However, for downlink communications, there is a concern that the user apparatus may receive relatively large interference from the BS1 since received power of a signal from the BS1 is greater than received power of a signal from the BS2.

In this way, when the same base station is selected for both downlink communications and uplink communications, either of the downlink signal quality and the uplink signal quality may deteriorate. Moreover, there is a concern for deterioration of system capacity and wasting of radio resources due to interference received by a base station or a user apparatus becoming large, (3) Connection is Made Separately for Uplink and Downlink.

FIG. 3 shows how different base stations are selected between downlink data transmission and uplink data transmission when user equipment (UE) is in the section of the shaded portion of FIG. 1 (for this type of system, see Non-patent document 1, for example). More specifically, the user equipment UE receives downlink data from the base station BS1 for the macro cell and transmits uplink data to the base station BS2 for the pico cell. In this way, the above-described concerns may be dealt with.

Now, certain information needs to be fed back in uplink for downlink data transmission. Certain information also needs to be fed back in downlink for uplink data transmission. For both uplink and downlink, a representative example of information requiring feedback is acknowledgement information, which shows acknowledgement (ACK) or non-acknowledgement to received data. Moreover, channel quality indicator (CQI), which shows how good downlink channel state is, is transmitted in uplink. For the present method, feedback information on downlink data is transmitted from the user equipment UE to the base station BS1 for the macro cell. The feedback information on the uplink data is transmitted from the base station BS2 for the pico cell to the user equipment UE.

Thus, with this method, there is again a concern for problems described in (1) and (2) with respect to transmission of feedback information. In other words, the base station BS2 for the pico cell ends up receiving large interference due to feedback conducted in uplink. Moreover, feedback conducted in downlink ends up receiving large interference from the macro cell.

Non-patent document 1 3GPP, C.S0084-001-0, "Physical layer for Ultra Mobile Broadband (UMB) air interface specification," August 2007.

SUMMARY OF THE INVENTION

Problem(s) to be Solved by the Invention

The problem to be solved by the present invention is to achieve, in a mobile communications system having a user apparatus, a radio base station, and a remote radio apparatus which relays a signal between the user apparatus and the radio base station, a reduction of interference received by the user equipment or interference received by a remote radio base station.

Means for Solving the Problem

A user apparatus according to one embodiment of the present invention is for use in a mobile communications system, which mobile communications system includes a radio base station and a remote radio apparatus connected with a high-speed transmission medium to the radio base station.

The user apparatus includes a received level measuring unit which measures a received level of a signal transmitted from the radio base station and a received level of a signal transmitted from the remote radio apparatus and detects a change in relative magnitudes of measured values; a path loss measuring unit which measures a path loss between the user apparatus and the radio base station and a path loss between the user apparatus and the remote radio apparatus and detects a change in relative magnitudes of measured values; and a transmitter which transmits a report signal which shows that a predetermined event has occurred. The predetermined event occurs if the relative magnitudes of the received levels are reversed and/or if the relative magnitudes of the path losses are reversed.

Advantage of the Invention

One embodiment of the present invention makes it possible to achieve, in a mobile communications system having a user apparatus, a radio base station, and a remote radio apparatus which relays a signal between the user apparatus and the radio base station, a reduction of interference received by the user apparatus or interference received by a remote radio base station.

BRIEF DESCRIPTION OF THE DRAWINGS

FIG. 1 is a diagram illustrating how base stations of different transmission power neighbor;

FIG. 5 is a flowchart illustrating an exemplary operation according to one embodiment;

DESCRIPTION OF THE PREFERRED EMBODIMENTS

[Description of Notations]

Figure 2A:
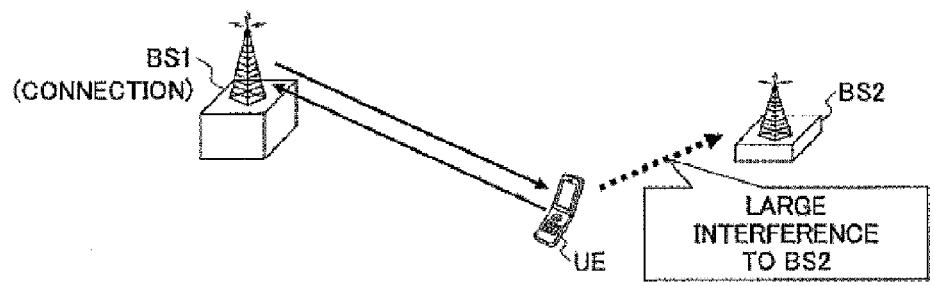
FIG. 2A is a diagram illustrating how user equipment is connected to a macro cell.
Figure 2B:
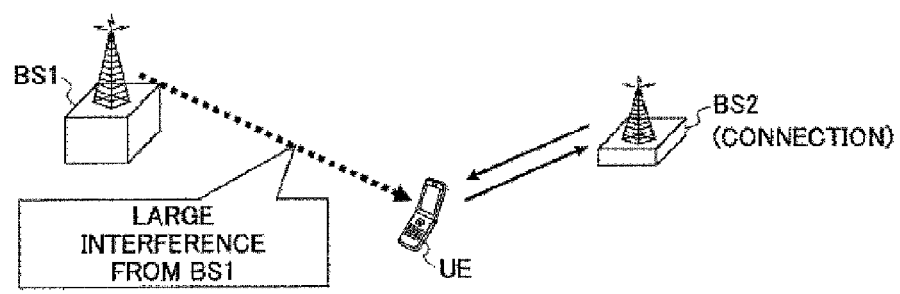
FIG. 2B is a diagram illustrating how the user equipment is connected to a pico cell.
Figure 3:
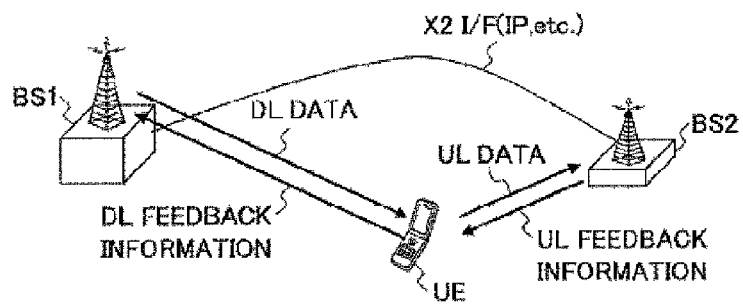
FIG. 3 is a diagram illustrating how the user equipment is connected separately for downlink and uplink.

101 received power measuring unit; 102 comparing unit; 103 measurement report signal generating unit; 105 path loss determining unit; 106 comparing unit; 107 measurement report signal generating unit; 111, 117 radio interface (RF-IF); 112 base band processor; 113, 115 optical interface (optical IF); 114 other node interface (other node IF); 116 relay processing unit

BEST MODE OF CARRYING OUT THE INVENTION

A mobile communications system used in one embodiment of the present invention has user equipment, a radio base station, and remote radio equipment (RRE) which relays a signal between the user equipment and the radio base station. Radio link of the user equipment is connected to the radio base station or the remote radio equipment. The remote radio equipment RRE, which relays a signal between the radio base station BS and the user equipment UE, does not perform various determining processes (handover control, scheduling, etc.) as in the radio base station BS. Thus, where radio link of the user equipment UE is connected to is determined by the radio base station BS. Where connection is made to is determined based on a measurement report (MR) from the user equipment. In one embodiment of the present invention, the measurement report is processed separately for uplink and for downlink.

Depending on the result of comparing the magnitudes of the received level of a signal transmitted from the radio base station BS and of the received level of a signal transmitted from the remote radio equipment RRE, a measurement report (MR) signal for downlink is provided by the user equipment and reported to the radio base station. Depending on the result of comparing the magnitudes of a path loss between the user equipment and the radio base station and of a path loss between the user equipment and the remote radio equipment RRE, a measurement report (MR) signal for uplink is provided by the user equipment and reported to the radio base station. The measurement report signal may be reported directly from the user equipment to the radio base station, or may be reported to the radio base station via the remote radio equipment RRE. In the latter case, there is a concern for transmission delay of a measurement report signal if the radio base station and the remote radio equipment RRE are connected by an existing inter-base station interface (X2). However, in one embodiment of the present invention, the radio base station and the remote radio equipment are connected by a high-speed transmission medium such as an optical fiber, so that such a transmission delay hardly needs to be considered.

According to one embodiment of the present invention, if a received level of a signal transmitted from the radio base station is greater than a received level of a signal transmitted from the remote radio equipment, the downlink signal may be received from the radio base station not via the remote radio equipment. This is preferable from a viewpoint of optimizing where to connect downlink to.

According to one embodiment of the present invention, if the path loss between the user equipment and the radio base station is greater than the path loss between the user equipment and the remote radio equipment, the uplink signal may be transmitted to the radio base station via the remote radio equipment. This is preferable from a viewpoint of optimizing where to connect uplink to.

According to one embodiment of the present invention, if a received level of a signal transmitted from the radio base station is greater than a received level of a signal transmitted from the remote radio equipment and if the path loss between the user equipment and the radio base station is greater than the path loss between the user equipment and the remote radio equipment, the downlink signal may be received from the radio base station not via the remote radio equipment and the uplink signal may be transmitted to the radio base station via the remote radio equipment. This is preferable from a viewpoint of optimizing where to connect uplink and downlink to.

Moreover, when the downlink control signal is received from the radio base station not via the remote radio equipment, the uplink control signal may be transmitted to the radio base station via the remote radio equipment, and uplink and downlink data signals may be not only transmitted and received via the remote radio equipment with the radio base station, but also transmitted and received through a radio link not via the remote radio equipment. Transmitting a data signal in a route via the remote radio equipment RRE and a route not via the RRE is preferable from a viewpoint of signal quality improvement by site diversity or selective diversity.

According to one embodiment of the present invention, when comparing the magnitudes of a first received level of a signal transmitted from the radio base station and a second received level of a signal transmitted from the remote radio equipment, a predetermined offset may be added to both or one of the first received level and the second received level. Properly adjusting an offset makes it possible to intentionally stagger a point of occurrence of a handover event.

According to one embodiment of the present invention, an instruction signal for switching where to connect uplink and downlink may be received via remote radio equipment from a radio base station or directly from the radio base station. This is preferable from a point of view of making the function of the remote radio equipment dedicated to a relay function for simplification.

According to one embodiment of the present invention, an uplink control signal may include at least one of information indicating downlink channel state and information indicating acknowledgement or non-acknowledgement to a downlink data signal.

According to one embodiment of the present invention, a radio base station apparatus is used. The radio base station apparatus is used in a mobile communications system and is connected to remote radio equipment with a high-speed transmission medium. The radio base station includes:

a radio interface for wirelessly communicating with user equipment; and a determining unit which determines where to connect a radio link of the user equipment to based on a report signal received from the user equipment via the radio interface or via the remote radio equipment.

The report signal indicates that a predetermined event has occurred.

The predetermined event occurs when (a) a received level of a signal transmitted from the radio base station and a received level of a signal transmitted from the remote radio equipment meet a predetermined condition, and/or (b) a path loss between the user equipment and the radio base station and a path loss between the user equipment and the remote radio equipment meet a predetermined condition.

A method according to one embodiment of the present invention is used in a mobile communications system, which mobile communications system includes user equipment, a radio base station, and remote radio equipment which is connected via a high-speed transmission medium to the radio base station. The method includes the steps of:

measuring at the user equipment a received level of a signal transmitted from the radio base station, a received level of a signal transmitted from the remote radio equipment, a path loss between the user equipment and the radio base station, and a path loss between the user equipment and the remote radio equipment;

transmitting, from the user equipment, a report signal indicating that a predetermined event has occurred;

determining, at the radio base station, where to connect the radio link of the user equipment to based on the report signal; and reporting, to the user equipment from the radio base station via the remote radio equipment or directly from the radio base station, an instruction signal for switching where to connect to.

The predetermined event occurs when the relative magnitudes of the received levels reverse and/or when the relative magnitudes of the path losses reverse.

The embodiments of the present invention are described from the following viewpoints:

A. System
B. Exemplary operations
B1. Exemplary operation (1)
B2. Exemplary operation (2)
B3C. Exemplary operation (3)
C. Variation
D. User equipment
E. Base station apparatus Embodiment 1

A. System

Figure 4:
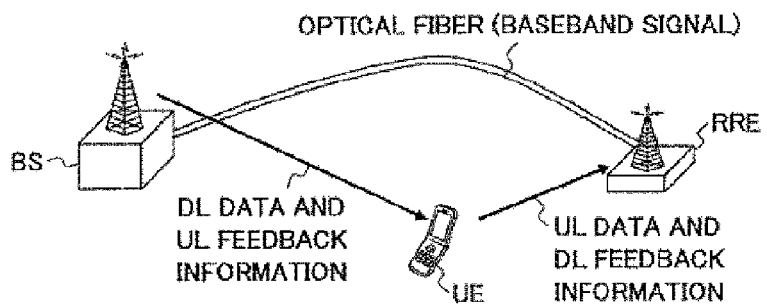
FIG. 4 is a diagram illustrating a mobile communications system according to one embodiment.

FIG. 4 shows a mobile communications system used in one embodiment of the present invention. The mobile communications system includes user equipment UE, a radio base station BS, and remote radio equipment RRE.

The user equipment UE communicates with the radio base station BS and the remote radio equipment RRE via a radio link. The user equipment UE, which is typically a mobile station such as a mobile terminal, may be any appropriate communications terminal.

The radio base station BS has a function of a base station for a macro cell. More specifically, the radio base station BS conducts various processes such as processing in the L1/L2 layer, handover control, scheduling, adaptive modulation and coding (AMC), retransmission control (HARQ), etc. In the present embodiment, the handover control may include not only handover control between macro cells, but also handover control between macro and pico cells and handover control between pico cells. The radio base station BS is connected to an upper-layer node and a core network, which are not shown for brevity of illustration.

The remote radio equipment RRE is connected to the radio base station BS with a high-speed medium such as an optical fiber. The remote radio equipment RRE, which does not perform handover control and retransmission control, etc., independently, mainly relays a signal between the radio base station BS and the user equipment UE.

For convenience of illustration, only one each of the user equipment UE, the radio base station BS and the remote radio equipment RRE is shown. However, there may be multiple of these as a matter of course. For example, multiple remote radio equipment RRE units may be connected to one radio base station.

B. Exemplary Operations

Below, exemplary operations are explained.

B1. Exemplary operation (1)

FIG. 5 is a flowchart illustrating an exemplary operation according to one embodiment. An operation is explained of user equipment UE which is connected to a pico cell and which is eventually connected to a macro cell.

Step S1 shows how the user equipment UE transacts data in communicating with the remote radio equipment RRE. In other words, the user equipment UE has uplink and downlink communications established with the remote radio equipment RRE. The user equipment UE is assumed to be located between the remote radio equipment RRE and a point A (FIG. 1).

The user equipment UE measures a received level of a downlink signal transmitted from the radio base station BS and a received level of a downlink signal transmitted from the remote radio equipment RRE. Moreover, the user equipment UE measures the path loss between the user equipment UE and the radio base station BS and the path loss between the user equipment UE and the remote radio equipment RRE, and also determines the relative magnitudes.

In general, the user equipment UE has a gain when uplink is connected to a base station with a small path loss. For example, when uplink transmission power from the user equipment UE is constant, the received power at the base station becomes greater and received quality becomes better when connecting to a base station with a small path loss. Moreover, for example, when the user equipment UE varies uplink transmission power according to the path loss, the uplink transmission power for the user equipment UE to transmit can be lowered when connecting to a base station BS (or remote radio equipment RRE) with a small path loss, making it possible to lower consumed power of the user equipment. The received level and the path loss may be measured periodically or may be measured non-periodically. When the user equipment UE exists between A and B, the relative magnitudes of downlink received power are such that downlink received power of the radio base station BS becomes higher, as shown in FIG. 1. When relative magnitudes of received power are compared, any offset may be added to both or either of the receive levels compared. Moreover, when relative magnitudes of received power are compared, any offset may be added to both or either of the path losses compared.

In step S3, relative magnitudes of downlink received power (received power related to radio base station BS and remote radio equipment RRE received power) change, and a measurement report (MR) signal which includes information on the change is generated at user equipment UE. The user equipment UE transmits the MR to the base station BS in uplink. The MR is transmitted to the base station BS via a route on which uplink communication is established. Thus, the measurement report MR signal may be transmitted directly to the radio base station BS (step S4), or may be reported to the radio base station BS via remote radio equipment RRE and an optical fiber (step S6). Both of steps S4 and S6 may be performed, or only one may be performed.

The step S6 is explained further. In the present embodiment, the radio base station BS may determine whether a handover is needed, but the remote radio equipment RRE may not, so that, if MR is transmitted to the remote radio equipment RRE, the MR signal must be transferred from the RRE to the BS. In this case, the MR signal is transmitted via the RRE to the BS, so that there may be a concern for a transmission delay relative to a case such that it is transmitted directly to the BS. However, in step S6 of the present embodiment, the MR signal propagates between the RRE and the BS via a high-speed transmission line such as an optical fiber, so that the transmission delay is considered to be not so long.

In step S7, the radio base station BS receives a measurement report signal MR, and determines whether to change where to connect the downlink radio link of the user equipment UE to (whether to handover). As described above, where to connect to optimally in this section differs between uplink and downlink. Whether to handover may be determined depending on whether a measurement report signal MR has been received, or, as described below, a different determining criterion may be used additionally (see FIG. 7).

When a measurement report signal (MR) indicates that received power of the signal transmitted from the radio base station BS was greater than received power of the signal transmitted from the remote radio equipment RRE, a downlink signal is preferably transmitted directly to the user equipment UE, not via the remote radio equipment RRE. Thus, in step S7, where downlink of the user equipment UE is connected to is changed from the remote radio equipment RRE to the radio base station BS. An instruction of this change may be performed directly from the radio base station BS to the user equipment UE (step S8), or may be reported to the user equipment UE via an optical fiber and remote radio equipment RRE. Both of steps S8 and S10 may be performed, or only one may be performed.

In step S11, according to an instruction from the radio base station BS, the user equipment UE switches where to connect downlink to. Subsequently, an uplink signal is transmitted to the radio base station BS via the remote radio equipment RRE and the optical fiber as before (step S13), and a downlink signal is directly received from the radio base station BS (step S14). A downlink signal in this case includes not only a control signal but also a data signal. Moreover, an uplink signal includes not only a control signal but also a data signal. For convenience of illustration, step S14 is drawn after step S13, but this is not mandatory to the present invention. Depending on a signal transmitted, the order may be reversed, or they may be performed at the same time.

Figure 6A:
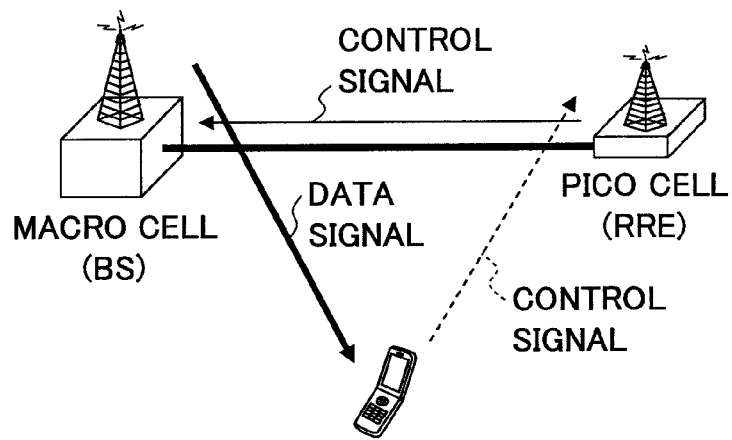
FIG. 6A is diagram schematically illustrating a signal flow regarding a downlink data signal.

FIG. 6A is a diagram schematically illustrating a signal flow with respect to a downlink data signal. FIG. 6A illustrates how the user equipment UE is located in between a point A and a point B in FIG. 1. A downlink data signal is directly transmitted from the radio base station BS to the user equipment UE. A control signal which includes acknowledgement information (ACK/NACK) to this data signal and information indicating a downlink channel state (CQI), etc., is transmitted to the radio base station BS via the remote radio equipment RRE and an optical fiber. The optical fiber connects the remote radio equipment RRE and the radio base station BS, so that a control signal is reported to the radio base station BS at high speed. The control signal which is transmitted from the user equipment UE and received at the radio base station BS via the remote radio equipment RRE and the optical fiber is demodulated and decoded at the radio base station BS. For example, the radio base station BS performs an adaptive modulation and channel encoding process (AMC) and radio resource scheduling based on a received CQI. The radio base station BS performs retransmission control based on a received ACK/NACK and retransmits the transmitted signal as needed.

Figure 6B:
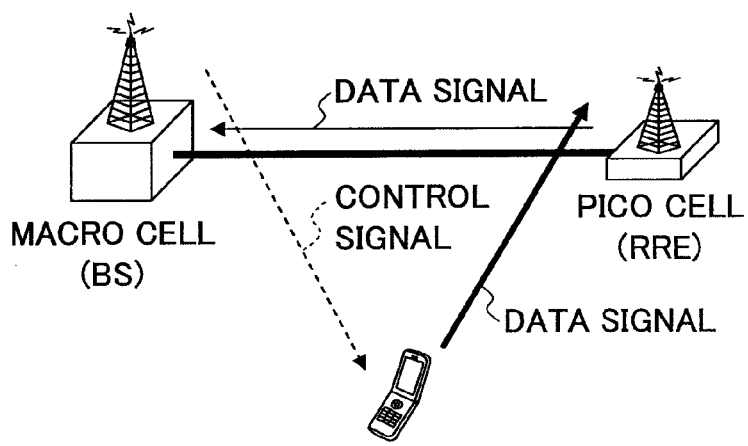
FIG. 6B is diagram schematically illustrating a signal flow regarding an uplink data signal.

FIG. 6B is a diagram schematically illustrating a signal flow with respect to an uplink data signal. As in FIG. 6A, FIG. 6B also illustrates how the user equipment is located in between a point A and a point B in FIG. 1. An uplink signal (a data signal and a pilot channel, etc.) is transmitted to the radio base station BS from the user equipment UE to the remote radio equipment RRE and the optical fiber. The radio base station BS, which receives the pilot channel transmitted with the data signal, may evaluate the uplink channel state and perform AMC and scheduling related to uplink. Moreover, acknowledgement information ACK/NACK to an uplink data signal is transmitted from the radio base station BS to the user equipment UE, not via the remote radio equipment RRE.

A downlink control signal which includes allocation information, etc., of a radio resource for uplink and/or downlink is transmitted directly from the radio base station BS to the user equipment UE.

Step S23 in FIG. 5 shows that user equipment UE generates and transmits a measurement report signal MR which indicates that the relative magnitudes of the path loss between the radio base station BS and the user equipment UE and the path loss between the user equipment UE and the remote radio equipment RRE are reversed. The user equipment UE is located between the point B (FIG. 1) and the radio base station BS. As a result, the relative magnitudes related to the received power do not change, but the relative magnitudes related to the path loss are reversed. A measurement report signal MR which indicates that the relative magnitudes have reversed must also be reported to a radio base station BS for a macro cell. As previously described with respect to step S3, the measurement report signal is transmitted to the base station BS via a route over which communications have been established. Thus, the measurement report MR signal may be transmitted directly to the radio base station BS (step S24), or may be reported to the radio base station BS via the remote radio equipment RRE and the optical fiber (step S26). Both of steps S24 and S26 may be performed, or only one may be performed.

In step S27, the radio base station BS receives a measurement report signal MR, and determines whether to change where to connect the radio link of the user equipment UE to (whether to handover). Whether to handover may be determined depending on whether a measurement report signal MR has been received, or, as described below, a different determining criterion may be used additionally (see FIG. 7).

If the path loss between the user equipment UE and the radio base station BS is less than the path loss between the user equipment UE and the remote radio equipment RRE, the uplink signal is preferably transmitted to the radio base station BS, not via the remote radio equipment RRE. Thus, in step S27, where uplink of the user equipment UE is connected to is changed from the remote radio equipment RRE to the radio base station BS. An instruction of this change may be done directly from the radio base station BS to the user equipment UE (step S28), or may be reported to the user equipment UE via the optical fiber and the remote radio equipment RRE (step S30). Both steps S28 and S30 may be performed, or only one may be performed.

In step S31, according to an instruction from the radio base station BS, the user equipment UE switches where to connect uplink to. Thereafter, respective uplink and downlink signals are directly transmitted to and received from the radio base station BS, not via the remote radio equipment RRE (step S33).

B2. Exemplary Operation (2)

Figure 7:
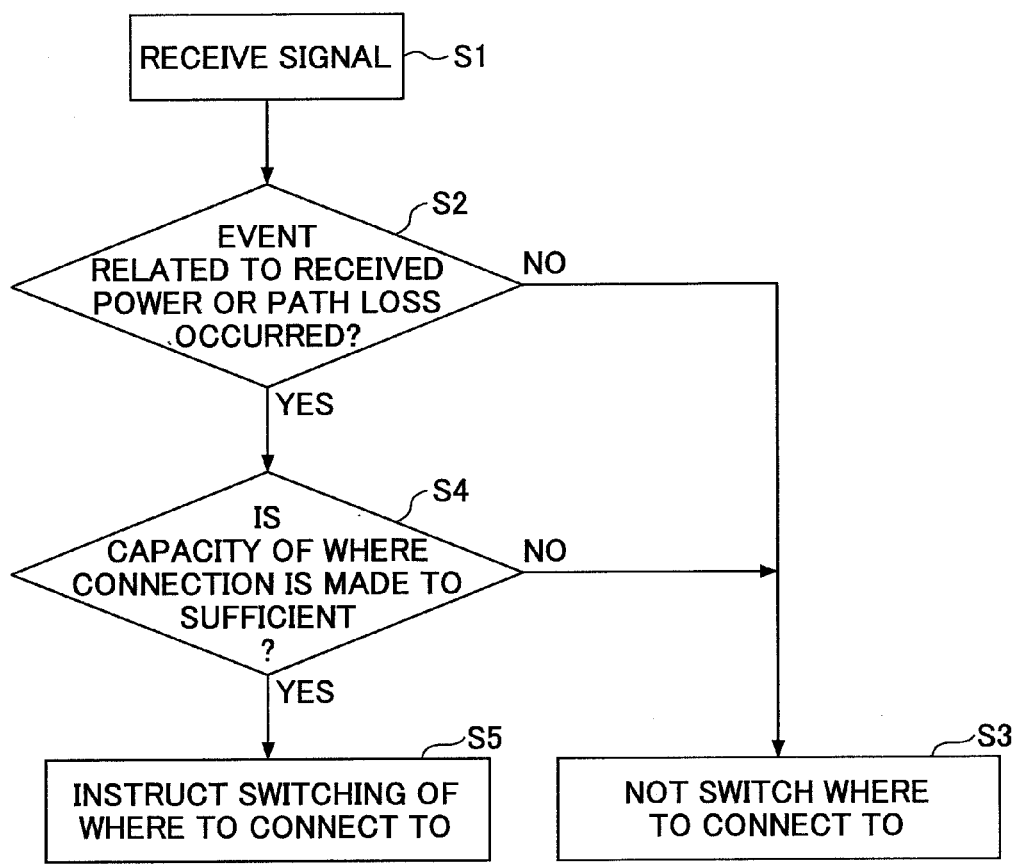
FIG. 7 is a flowchart illustrating an exemplary operation for determining whether handover is required.

FIG. 7 shows an example such that a different determining criterion is additionally utilized in addition to the fact that a measurement report signal MR is received when the radio base station BS determines whether the handover is needed. In step S1, the radio base station BS receives the measurement report signal MR directly from the user equipment UE or via the remote radio equipment RRE.

In step S2, whether a predetermined event has occurred on a received power or a path loss is checked. The predetermined event occurs when the relative magnitudes of the received levels are reversed and/or when the relative magnitudes of the path losses are reversed. When comparing the relative magnitudes, some offset may be added to both or either of amounts to be compared. If the predetermined event has not occurred, the flow proceeds to step S3, where a flow which determines whether a handover is needed is completed. If the predetermined event has occurred, the flow proceeds to step S4, wherein, when a current cell is switched, it is checked whether a cell switched to is provided with a sufficient communications capacity. For example, for step S7 in FIG. 5, it is determined whether where to connect to downlink to is to be switched from the remote radio equipment RRE to the radio base station BS. In this case, if there is not sufficient room for a communications capacity of the radio base station BS, where to connect to is not changed. In this case, the flow proceeds to step S3, wherein the flow ends. If it is determined that there is sufficient room for the communications capacity of the radio base station BS, the flow proceeds to step S5, wherein where to connect to downlink is switched. Additionally, the communications capacity and the traffic amount may be taken into account not only at the time of switching from the remote radio equipment RRE to the radio base station BS, but also at the time of switching from the radio base station BS to the remote radio equipment RRE.

Figure 8:
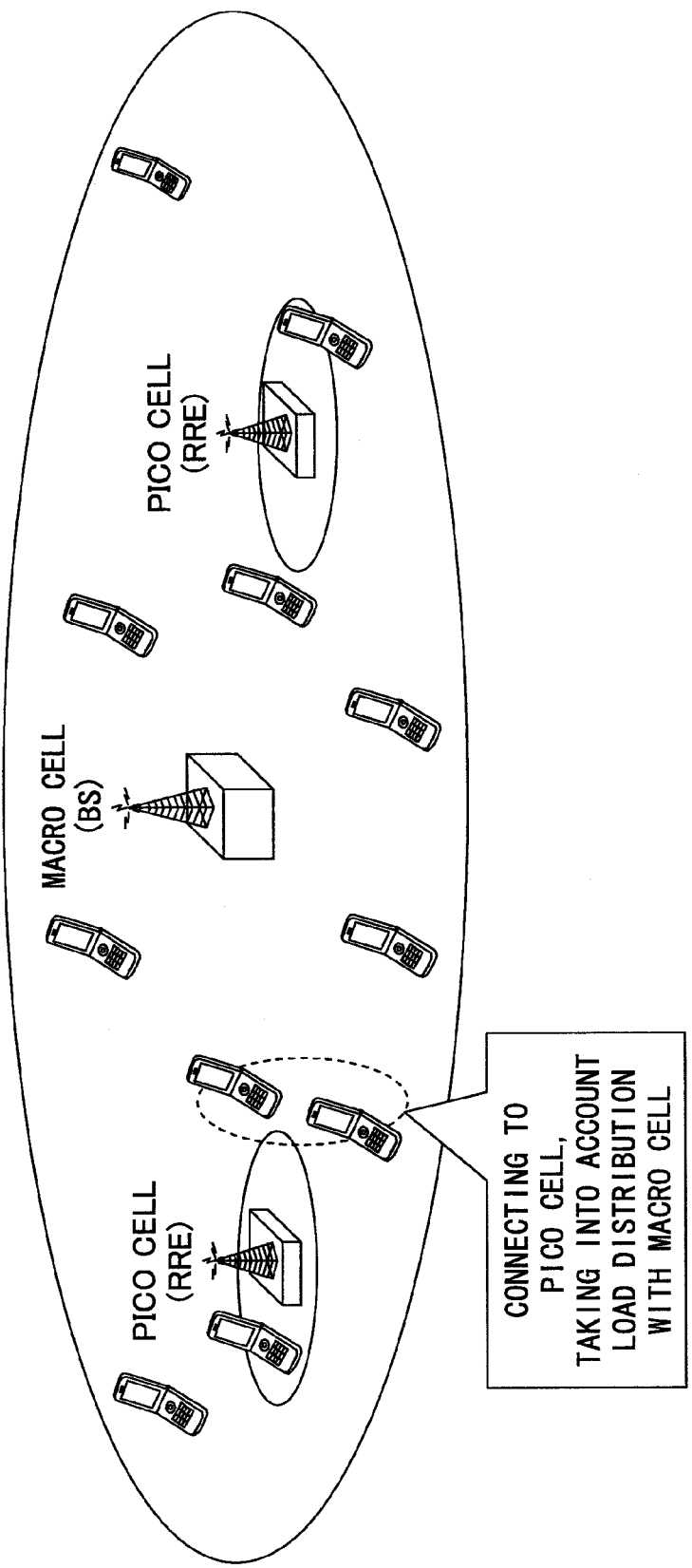
FIG. 8 is a diagram illustrating a mobile communications system which conducts handover, taking into account load distribution.

FIG. 8 schematically illustrates a system which determines whether a handover is needed while taking into account traffic volume between a macro cell and a pico cell. As shown, user equipment, which is shown in dotted line, is transmitting a measurement report signal MR, and is connected to the pico cell due to a large traffic volume at a micro cell.

B3. Exemplary Operation (3)

Figure 9:
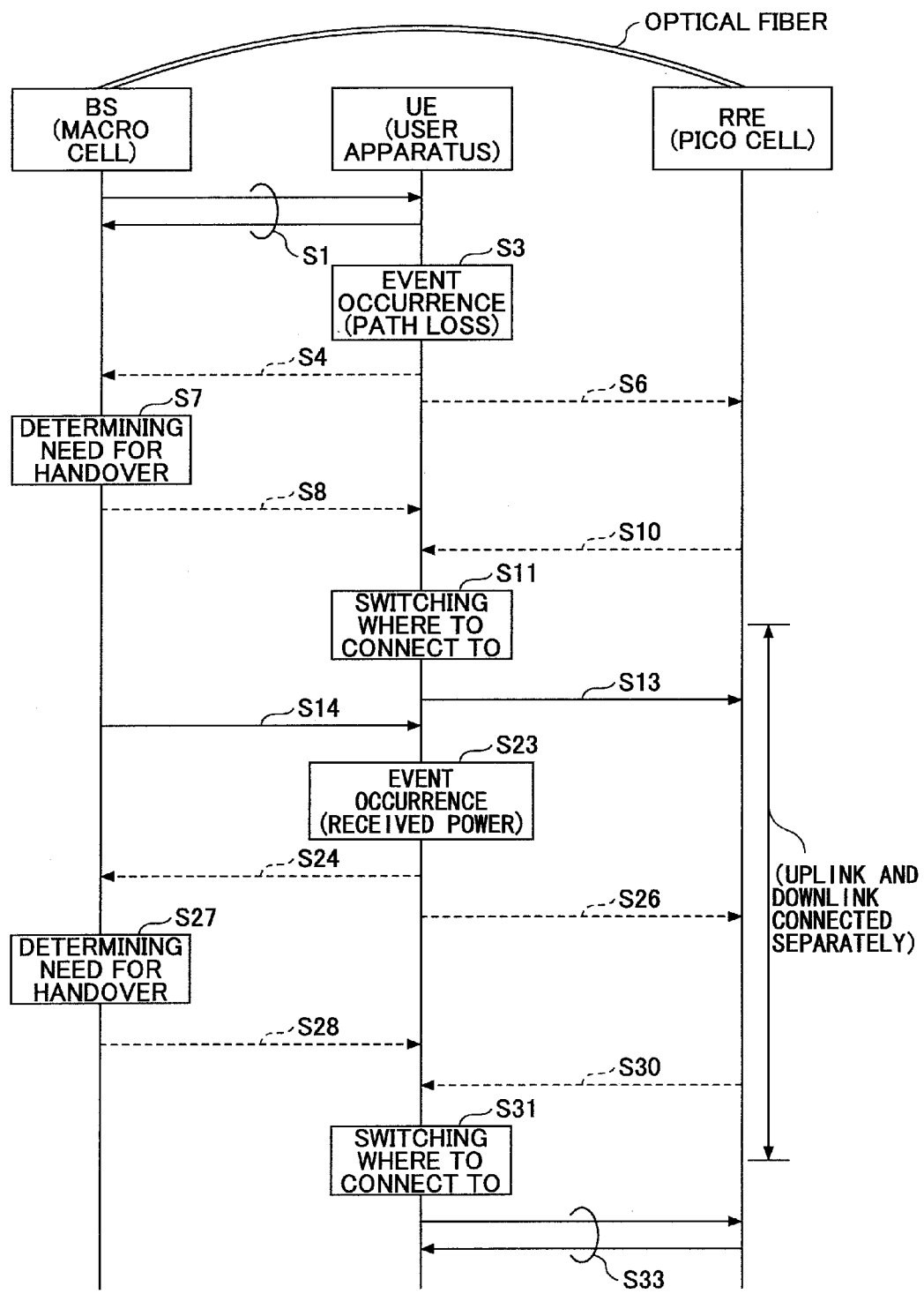
FIG. 9 is a flowchart illustrating another exemplary operation according to one embodiment.

FIG. 9, which shows an exemplary operation similar to FIG. 5, but differs in a sequence in which events occur. In other words, in an example shown in FIG. 9, the user equipment UE initially conducts communications with a radio base station BS for a macro cell, and moves toward a pico cell thereafter, and eventually conducts communications with remote radio equipment RRE for the pico cell. Thus, unlike FIG. 5, step S1 shows how the user equipment UE is conducting communications with the radio base station BS. When the user equipment UE moves toward the remote radio equipment RRE and enters between points B and A in FIG. 1, the user equipment UE creates and transmits a measurement report MR in response to a reversal in relative magnitudes related to a path loss (steps S3, S4, and S6). Then, whether a handover is needed is checked and instructed by the radio base station BS (steps S7, S8, and S10). In step S11, where uplink is connected to is changed from the radio base station BS to the remote radio equipment RRE. When the user equipment UE further approaches the remote radio equipment RRE, the user equipment UE generates and transmits a measurement report signal MR in response to a reversal of relative magnitudes with respect to received power (steps S23, S24, and S25). Then, whether a handover is needed is checked and instructed by the radio base station BS (steps S27, S28, and S30). In step S31, where downlink is connected to is changed from the radio base station BS to the remote radio equipment RRE. In this way, the user equipment UE is connected to the remote radio equipment RRE for both uplink and downlink (steps S33).

C. Variation

In the above embodiment, when the user equipment is located between points A and B in FIG. 1, where the user equipment UE is connected to is changed. In this case, it is not mandatory that all of downlink signals are received from the radio base station BS without passing through the remote radio equipment RRE. Moreover, it is also not mandatory that all of uplink signals are transmitted to the radio base station BS via the remote radio equipment RRE. From a point of view of achieving optimization of where to connect to, it is desirable to switch where all signals are connected to.

For example, where downlink and uplink control signals are connected to may be switched as such, but data signals may be arranged to be transmitted to and received from both the radio base station BS and the remote radio equipment RRE.

Moreover, both control and data signals may be arranged to be transmitted to and received from the radio base station BS and the remote radio equipment RRE.

Transmitting to and receiving from the radio base station BS and the remote radio equipment RRE the same signal is preferable from a point of view of signal improvement by site diversity or selective diversity.

In the above embodiment, handover between a macro cell and a pico cell has been explained. However, the present invention may be applied to handover between pico cells of different transmission power.

D. User Equipment

Figure 10:
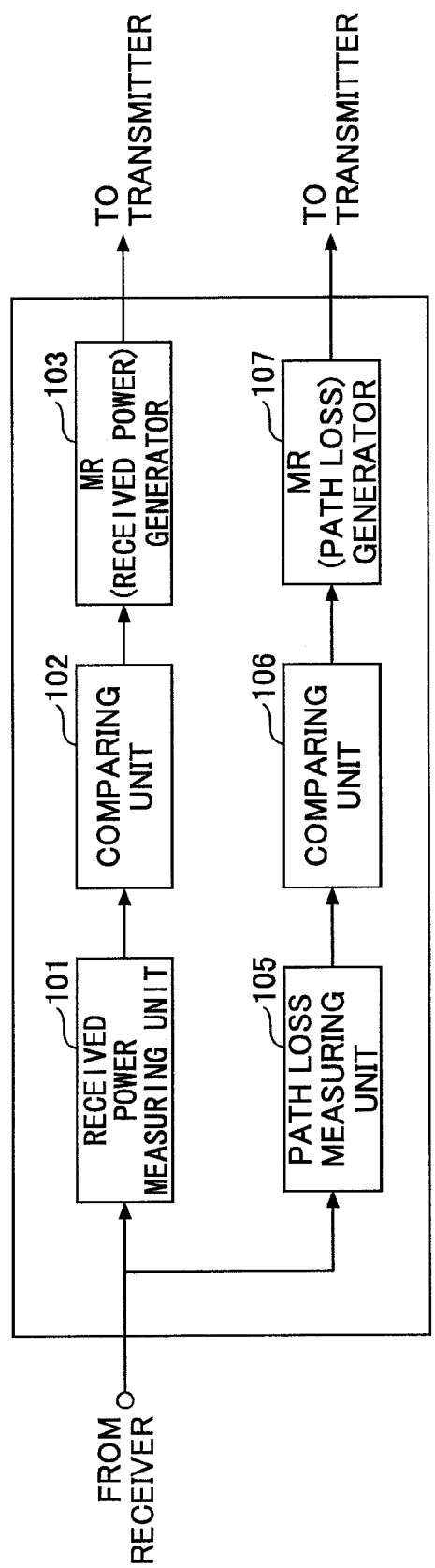
FIG. 10 is a diagram illustrating user equipment according to one embodiment.

FIG. 10 shows user equipment according to one embodiment. In FIG. 10 are shown a received power measuring unit 101, a comparing unit 102, a measurement report signal MR generating unit 103, a path loss measuring unit 105, a comparing unit 106, and a measurement report signal MR generating unit 107. In the user equipment, many functional elements (not shown) exist and elements shown represent elements which are particularly important to the embodiments.

The received power measuring unit 101 extracts a pilot signal from a base band received signal and measures a received level of the pilot signal. The received level may be expressed in any appropriate amount known in the art. For example, the received level may be expressed in received power (RSRP: reference signal received power), SIR, SINR, $E_c/N_0$, etc. In the present embodiment, the received level is expressed in received power. The pilot channel may be referred to as a reference signal. As described above, the received power measuring unit 101 measures the received level of a signal transmitted from the radio base station BS and the received level of a signal transmitted from the remote radio equipment RRE.

The comparing unit 102 compares the received levels and determines whether relative magnitudes have reversed. In comparing the relative magnitudes, offset may be taken into account for both or one of the received levels compared.

The measurement report signal MR generating unit 103 creates a measurement report signal MR based on results of comparing the relative magnitudes (for example, in response to a reversal in the relative magnitudes). This measurement report signal MR is subsequently transmitted to a transmitter (not shown), and reported to the radio base station BS via or not via the remote radio equipment RRE.

The path loss measuring unit 105 measures both the path loss between the user equipment UE and the radio base station BS and the path loss between the user equipment UE and the remote radio equipment RRE. As known in the art, the path loss is derived based on a difference between transmission power and received power. The path loss represents an average amount over a long period.

The comparing unit 106 compares the path losses and determines whether relative magnitudes have reversed. In comparing the relative magnitudes, offset may be taken into account for both or one of the path losses compared.

The measurement report signal MR generating unit 107 creates a measurement report signal MR based on results of comparing the relative magnitudes (for example, in response to a reversal in the relative magnitudes). This measurement report signal MR is subsequently transmitted to a transmitter (not shown), and reported to the radio base station BS via or not via the remote radio equipment RRE.

Unlike the related-art schemes, the measurement report signal MR related to the received level and the measurement report signal MR related to the path loss are separately processed. In this way, the radio base station may properly grasp the positional relationship of the user equipment UE relative to the radio base station BS and the remoter radio apparatus RRE.

E. Base Station Apparatus

Figure 11:
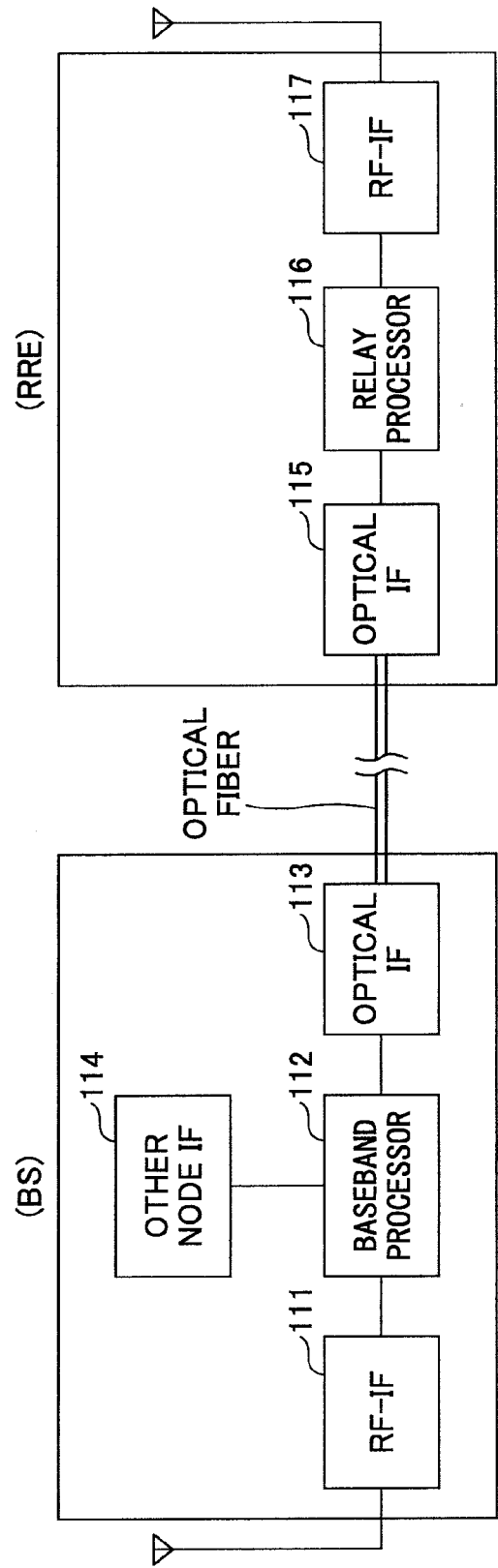
FIG. 11 is a diagram illustrating a base station apparatus and remote radio equipment according to an embodiment of the present invention.

FIG. 11 is a diagram illustrating a base station apparatus BS and remote radio equipment RRE according to one embodiment of the present invention. In FIG. 11 are shown radio interfaces (RF-IFs) 111, 117, a base band processor 112, optical interfaces (optical IFs) 113, 115, other node interface (IF) 114, and a relay processor 116.

The radio interfaces (RF-IFs) 111 and 117 perform signal conversion for transmitting and receiving a signal via user equipment UE and a radio link. For example, at the radio interfaces RF-IFs, processes of signal amplification, bandwidth limiting, frequency conversion, analog-to-digital conversion, digital-to-analog conversion, etc., are performed.

The base band processor 112 performs handover processing, radio resource scheduling, adaptive modulation and channel encoding processing, retransmission control processing, etc.

Optical interfaces (IF) 113 and 115 perform signal conversion for conducting optical communications between the radio base station BS and the remote radio equipment RRE.

The other node interface (other node IF) 114 is an interface for communicating with other radio base stations and upper-layer nodes (for example, a mobile management apparatus, a communications node within a core network, etc.)

The relay processor 116 performs a process for relaying, to the user equipment UE or the radio base station BS, a signal received at the remote radio equipment RRE. Unlike the base band processor 112 of the radio base station BS, it is not mandatory to independently perform the handover and retransmission control processes at the remote radio equipment RRE.

The present invention may be applied to any appropriate mobile communications system in which radio resources are shared between the users by scheduling. For example, the present invention may be applied to HSDPA/HSUPA W-CDMA, LTE, IMT-Advanced, WiMAX, Wi-Fi systems, etc.

As described above, while the present invention is described with reference to specific embodiments, the respective embodiments are merely exemplary, so that a skilled person will understand variations, modifications, alternatives, replacements, etc. While specific numerical value examples are used to facilitate understanding of the present invention, such numerical values are merely examples, so that any appropriate value may be used unless specified otherwise. Breakdown of items in the above embodiment is not essential to the present invention, so that matters described in two or more items may be combined for use as needed. For convenience of explanation, while the apparatuses according to the embodiments of the present invention are explained using functional block diagrams, such apparatuses as described above may be implemented in hardware, software, or a combination thereof. The present invention is not limited to the above embodiments, so that variations, modifications, alternatives, and replacements are included in the present invention without departing from the spirit of the present invention.

The present international application claims priority based on Japanese Patent Application No. 2008-207486 filed on Aug. 11, 2008, the entire contents of which are hereby incorporated by reference.

The invention claimed is:

1. A user apparatus used in a mobile communications system, wherein the mobile communications system includes a radio base station and a remote radio apparatus connected with a high-speed transmission medium to the radio base station, the user apparatus comprising:
a received level measuring unit which measures received levels of a signal transmitted from the radio base station and received levels of a signal transmitted from the remote radio apparatus and detects a change in relative magnitudes of measured values;
a path loss measuring unit which measures a path loss between the user apparatus and the radio base station and a path loss between the user apparatus and the remote radio apparatus and detects a change in relative magnitudes of measured values; and
a transmitter which transmits a report signal which shows that a predetermined event has occurred, wherein
the predetermined event occurs if the relative magnitudes of the received levels are reversed and if the relative magnitudes of the path losses are reversed,
wherein where radio downlink is connected to is switched between the radio base station and the remote radio apparatus if the predetermined event related to a received level occurs, and
wherein where an uplink radio signal is connected to is switched between the radio base station and the remote radio apparatus if the predetermined event related to a path loss occurs.

2. The user apparatus according to claim 1, wherein, if the received level of the signal transmitted from the radio base station is greater than the received level of the signal transmitted from the remote radio apparatus, a downlink radio signal is received from the radio base station not via the remote radio apparatus.

3. The user apparatus as claimed in claim 1, wherein the uplink radio signal is transmitted to the radio base station via the remote radio apparatus if the path loss between the user apparatus and the radio base station is greater than the path loss between the user apparatus and the remote radio apparatus.

4. The user apparatus as claimed in claim 1, wherein an instruction signal for switching where uplink and downlink are connected to is received via the remote radio apparatus or directly from the radio base station.

5. The user apparatus as claimed in claim 1, wherein the transmitter transmits an uplink radio control signal that includes at least one of information indicating a downlink radio channel state and information indicating acknowledgement or non-acknowledgement for a downlink data signal.

6. A user apparatus used in a mobile communications system, wherein the mobile communications system includes a radio base station and a remote radio apparatus connected with a high-speed transmission medium to the radio base station, the user apparatus comprising:
a received level measuring unit which measures received levels of a signal transmitted from the radio base station and received levels of a signal transmitted from the remote radio apparatus and detects a change in relative magnitudes of measured values;
a path loss measuring unit which measures a path loss between the user apparatus and the radio base station and a path loss between the user apparatus and the remote radio apparatus and detects a chan magnitudes of measured values; and
a transmitter which transmits a report signal which shows that a predetermined event has occurred,
wherein the predetermined event occurs if the relative magnitudes of the received levels are reversed and if the relative magnitudes of the path losses are reversed,
wherein, if the received level of the signal transmitted from the radio base station is greater than the received level of the signal transmitted from the remote radio apparatus and if the path loss between the user apparatus and the radio base station is greater than the path loss between the user apparatus and the remote radio apparatus,
a downlink radio signal is received from the radio base station not via the remote radio apparatus, and
an uplink radio signal is transmitted to the radio base station via the remote radio apparatus.

7. The user apparatus as claimed in claim 6, wherein when a downlink radio control signal is received from the radio base station not via the remote radio apparatus,
an uplink radio control signal is transmitted to the radio base station via the remote radio apparatus, and
uplink and downlink data signals are not only transmitted to and received from the radio base station via the remote radio apparatus with, but also transmitted to and received from the radio base station through a radio link without passing through the remote radio apparatus.

8. The user apparatus as claimed in claim 6, wherein, when comparing magnitudes of a first received level of a signal transmitted from the radio base station and a second received level of a signal transmitted from the remote radio apparatus, a predetermined offset is added to both or one of the first received level and the second received level.

9. The user apparatus as claimed in claim 6, wherein an instruction signal for switching where uplink and downlink are connected to is received via the remote radio apparatus or directly from the radio base station.

10. The user apparatus as claimed in claim 6, wherein the transmitter transmits an uplink radio control signal that includes at least one of information indicating a downlink radio channel state and information indicating acknowledgement or non-acknowledgement for a downlink data signal.

11. A radio base station connected to a remote radio apparatus with a high-speed transmission medium, the radio base station being for use in a mobile communications system, the radio base station comprising:
- a radio interface for wirelessly communicating with a user apparatus; and
- a determining unit which determines where to connect a radio link of the user apparatus to based on a report signal received from the user apparatus via the radio interface or via the remote radio apparatus, wherein
- the report signal indicates that a predetermined event has occurred, and wherein
- the predetermined event occurs (a) if a received level of a signal transmitted from the radio base station and a received level of a signal transmitted from the remote radio apparatus meet a predetermined condition, and (b) if a path loss between the user apparatus and the radio base station and a path loss between the user apparatus and the remote radio apparatus meet a predetermined condition, wherein
- where radio downlink of the user apparatus is connected to is switched between the radio base station and the remote radio apparatus if the predetermined event related to a received level occurs, and
- where an uplink radio signal is connected to is switched between the radio base station and the remote radio apparatus if the predetermined event related to a path loss occurs.

12. The radio base station as claimed in claim 11, wherein a downlink radio signal is transmitted directly to the user apparatus not via the remote radio apparatus when the report signal indicates that the received level of the signal transmitted from the radio base station was greater than the received level of the signal transmitted from the remote radio apparatus.

13. The radio base station as claimed in claim 11, wherein the uplink radio signal is received via the remote radio apparatus when the report signal indicates that the path loss between the user apparatus and the radio base station was greater than the path loss between the user apparatus and the remote radio apparatus.

14. The radio base station as claimed in claim 11, wherein an instruction signal for switching where uplink and downlink of the user apparatus are connected to is transmitted via the remote radio apparatus or directly from the radio base station.

15. The radio base station as claimed in claim 11, wherein the radio base station receives an uplink radio control signal that includes at least one of information indicating a downlink radio channel state and information indicating acknowledgement or non-acknowledgement for a downlink data signal.

16. A radio base station connected to a remote radio apparatus with a high-speed transmission medium, the radio base station being for use in a mobile communications system, the radio base station comprising:
- a radio interface for wirelessly communicating with a user apparatus; and
- a determining unit which determines where to connect a radio link of the user apparatus to based on a report signal received from the user apparatus via the radio interface or via the remote radio apparatus, wherein
- the report signal indicates that a predetermined event has occurred, and wherein
- the predetermined event occurs (a) if a received level of a signal transmitted from the radio base station and a received level of a signal transmitted from the remote radio apparatus meet a predetermined condition, and (b) if a path loss between the user apparatus and the radio base station and a path loss between the user apparatus and the remote radio apparatus meet a predetermined condition,
- wherein, when the report signal indicates that the received level of the signal transmitted from the radio base station was greater than the received level of the signal transmitted from the remote radio apparatus and that the path loss between the user apparatus and the radio base station was greater than the path loss between the user apparatus and the remote radio apparatus,
- a downlink radio signal is transmitted directly to the user apparatus not via the remote radio apparatus, and
- an uplink radio signal is received via the remote radio apparatus.

17. The radio base station as claimed in claim 16, wherein when a downlink radio control signal is transmitted directly to the user apparatus not via the remote radio apparatus,
- an uplink radio control signal is transmitted via the remote radio apparatus, and
- uplink and downlink data signals are not only transmitted to and received from the user apparatus via the remote radio apparatus, but also transmitted to and received from the user apparatus through a radio link without passing through the remote radio apparatus.

18. The radio base station as claimed in claim 16, wherein, if the report signal is received, where the radio link of the user apparatus is connected to is determined by the determining unit based on a traffic volume of the radio base station.

19. The radio base station as claimed in claim 16, wherein an instruction signal for switching where uplink and downlink of the user apparatus are connected to is transmitted via the remote radio apparatus or directly from the radio base station.

20. The radio base station as claimed in claim 16, wherein the radio base station receives an uplink radio control signal that includes at least one of information indicating a downlink radio channel state and information indicating acknowledgement or non-acknowledgement for a downlink data signal.

21. A method for use in a mobile communications system, the mobile communications system including a user apparatus, a radio base station and a remote radio apparatus connected with a high-speed transmission medium to the radio base station, the method comprising the steps of:
- measuring at the user apparatus a first received level of a signal transmitted from the radio base station, a second received level of a signal transmitted from the remote radio apparatus, a first path loss between the user apparatus and the radio base station, and a second path loss between the user apparatus and the remote radio apparatus;
- transmitting, from the user apparatus, a report signal showing that a predetermined event has occurred;
- determining, at the radio base station, where to connect a radio link of the user apparatus to based on the report signal; and
- reporting, to the user apparatus via the remote radio apparatus or directly from the radio base station, an instruction signal for switching where to connect to, wherein
- the predetermined event occurs if relative magnitudes of the first received level and the second received level are reversed and if relative magnitudes of the first path loss and the second path loss are reversed,
- wherein radio downlink of the user apparatus is connected to is switched between the radio base station and the remote radio apparatus if the predetermined event related to a received level occurs, and where an uplink radio signal is connected to is switched between the radio base station and the remote radio apparatus if the predetermined event related to a path loss occurs.

22. A method for use in a mobile communications system, the mobile communications system including a user apparatus, a radio base station and a remote radio apparatus connected with a high-speed transmission medium to the radio base station, the method comprising the steps of:

measuring at the user apparatus a first received level of a signal transmitted from the radio base station, a second received level of a signal transmitted from the remote radio apparatus, a first path loss between the user apparatus and the radio base station, and a second path loss between the user apparatus and the remote radio apparatus;

transmitting, from the user apparatus, a report signal showing that a predetermined event has occurred;

determining, at the radio base station, where to connect a radio link of the user apparatus to based on the report signal; and reporting, to the user apparatus via the remote radio apparatus or directly from the radio base station, an instruction signal for switching where to connect to, wherein the predetermined event occurs if relative magnitudes of the first received level and the second received level are reversed and if relative magnitudes of the first path loss and the second path loss are reversed, wherein when the report signal indicates that the first received level of the signal transmitted from the radio base station was greater than the second received level of the signal transmitted from the remote radio apparatus and that the first path loss between the user apparatus and the radio base station was greater than the second path loss between the user apparatus and the remote radio apparatus, a downlink radio signal is transmitted directly to the user apparatus not via the remote radio apparatus, and an uplink radio signal is received via the remote radio apparatus.

* * * * *